United States Patent [19]
Maeda

[11] Patent Number: 4,618,809
[45] Date of Patent: Oct. 21, 1986

[54] APPARATUS FOR CONVERTING SINGLE-PHASE POWER TO THREE-PHASE OUTPUTS

[75] Inventor: Naoyuki Maeda, Inuyama, Japan

[73] Assignee: Tokai TRW & Co., Ltd., Aichi, Japan

[21] Appl. No.: 742,204

[22] Filed: Jun. 7, 1985

[30] Foreign Application Priority Data

Jun. 8, 1984 [JP] Japan ................................ 59-118008

[51] Int. Cl.⁴ .............................................. H02P 7/00
[52] U.S. Cl. ...................................... 318/768; 363/2; 363/148; 363/154
[58] Field of Search ...................... 363/1, 2, 4, 10, 36, 363/148, 151, 154; 318/768

[56] References Cited

U.S. PATENT DOCUMENTS 4,060,754 11/1977 Kirtley et al. ........................ 318/768

FOREIGN PATENT DOCUMENTS

| 2360509 | 6/1975 | Fed. Rep. of Germany ...... 318/768 |
| 56480 | 4/1980 | Japan ........................................ 363/4 |
| 311348 | 11/1971 | U.S.S.R. .................................. 363/4 |

*Primary Examiner*—William H. Beha, Jr.
*Attorney, Agent, or Firm*—Yount & Tarolli

[57] ABSTRACT

An inverter apparatus for converting a single-phase A.C. power source to three-phase A.C. outputs is described wherein the single-phase power source is directly connected to a first phase load and is connected through a one-phase converter to a second phase load, and the single-phase power source and the one-phase converted single-phase power source are connected to a third phase load and a fourth phase load, the third and fourth phase loads being formed by dividing a single load, so that three-phase power outputs are provided for the first phase load, the second phase load, and the third plus fourth loads.

3 Claims, 2 Drawing Figures

APPARATUS FOR CONVERTING SINGLE-PHASE POWER TO THREE-PHASE OUTPUTS

FIELD OF THE INVENTION

The present invention relates to an inverter apparatus for converting a single-phase A.C. signal to three-phase A.C. signals.

BACKGROUND OF THE INVENTION (PRIOR ART)

In the prior art, an inverter apparatus for converting a single-phase signal to three-phase signals has comprised a three-phase full-wave converter circuit, as a phase shifting converter, which uses a semiconductor switching element for each of the three phases and applies three-phase A.C. signals each having a 120° phase difference therebetween to the associated load coils in the three phases.

In general, with respect to the construction of a single-phase induction motor used for such electrically powered machines as an air conditioner, a laundry machine and a refrigerator, which machines may be operated by a home-wired single-phase A.C. power source, a stator may be formed by a main winding and an auxiliary winding for a starting operation and a rotor may be of a cage type. As compared with a three-phase induction motor operated by an industrial power wiring, such single-phase induction motor is inferior in starting and other electric characteristics, requires a relatively large number of elements and becomes large in size. Also, it is impossible in such single-phase induction motor to effectively provide the winding throughout the periphery of the rotor, unlike a three-phase induction motor.

In order to self-start the single-phase induction motor, it is necessary to provide a shading coil, or a centrifugal contact and a phase advance capacitor. However, this complicates the mechanism of the motor.

SUMMARY OF THE INVENTION

The present invention is directed to overcome the problems described above.

It is an object of this invention to provide an improved, or small-sized and simplified inverter apparatus for converting a single-phase A.C. power source to three-phase A.C. outputs.

Another object of this invention is to provide an inverter apparatus having a favourable starting characteristic and a high conversion efficiency.

Another object of this invention is to provide an inverter apparatus capable of easily operating three-phase powered machines by using home wiring of a single-phase A.C. power source.

Another object of this invention is to provide an inverter apparatus for converting a single-phase A.C. power source to three-phase A.C. outputs, wherein the single-phase power source is directly connected to a first phase load and is connected through one-phase converter to a second phase load, and the single-phase power source and the one-phase converted single-phase power source are connected to a third phase load and a fourth phase load, the third and fourth phase loads being formed by equally dividing a single load, so that three-phase power outputs are provided for the first phase load, the second phase load, and the combination of the third and fourth phase loads.

According to the present invention, it is possible to obtain the three-phase output from the single-phase power source by means of directly connecting the single-phase A.C. power source to the load of the S1 phase, connecting the power source through the phase converter circuit to the load of the S2 phase, and connecting the S1 and S2 phases to the loads of the S3 and S3' phases. It is advantageous, therefore, that, as compared with a single-phase electric motor having a winding the same in size as those of a three-phase motor, the phase current is small and the resistance loss is halved and, accordingly, the three-phase motor can be small-sized, assuming that there is no difference in loss therebetween.

Additionally, according to the inverter apparatus using a simplified electronic circuit for ope-phase conversion and the method of load connection of the present invention, operation of three-phase powered machines is easily effected by using the home wiring of the single-phase A.C. power source.

DESCRIPTION OF THE PREFERRED EMBODIMENT

Figure 1:
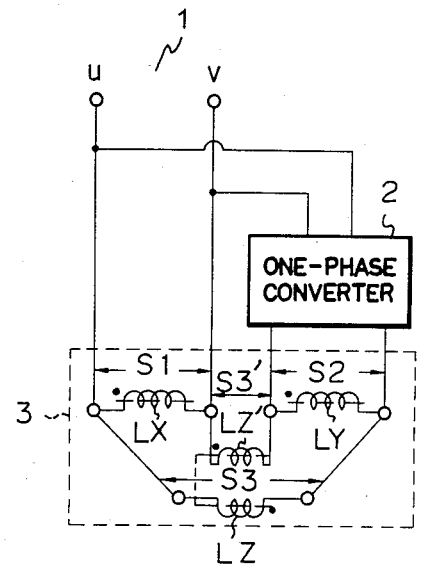
FIG. 1 shows a schematic circuit diagram embodying the inverter apparatus of the present invention.

In the inverter apparatus of the present invention, as shown in FIG. 1, a single-phase A.C. power source 1 is directly connected to a coil LX in a load coil circuit 3, which provides a three-phase output, and is connected to a coil LY in the load coil circuit 3 through a one-phase converter 2 which outputs a signal showing a 120° phase difference from that of the A.C. power source. A phase current composed by the two phase-shifted power sources is supplied to a pair of coils LZ and LZ' in the load coil circuit 3 so as to obtain the three-phase outputs for the load coil circuit 3.

Figure 2:
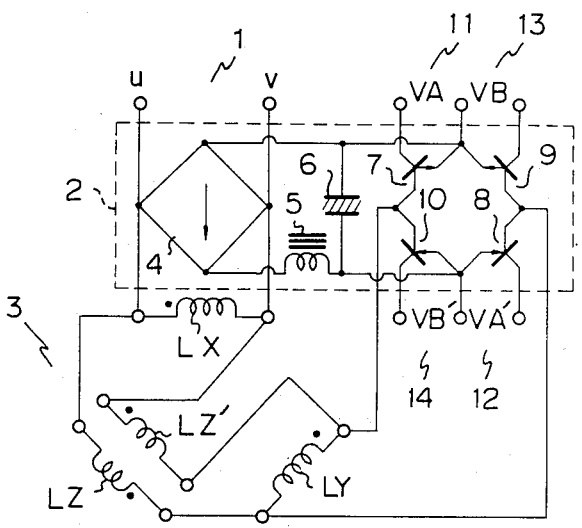
FIG. 2 shows a circuit diagram embodying the inverter apparatus and the method of the load connection of the present invention.

Referring now to FIG. 2, the power source 1 is connected to a load coil LX through input terminals u and v. The power source 1 is also connected through the input terminals u and v to a rectifier 4 in the one-phase converter 2. A D.C. output signal from the rectifier 4 is connected through a smoothing circuit comprising a choke coil 5 and a capacitor 6 to a bridge circuit comprising transistors 7, 8, 9 and 10. One output terminal of the rectifier 4 is connected to each of the emitters of the transistors 7 and 9, and the other output terminal is connected to each of the emitters of the transistors 8 and 10. The base and the emitter of the transistor 7 are connected to the terminals 11, and the base and the emitter of the transistor 9 are connected to the terminals 13. The base and the emitter of the transistor 8 are connected to the terminals 12, and the base and the emitter of the transistor 10 are connected to the terminals 14. Provided to the respective input terminals 11, 12, 13 and 14 are positive pulses VA and VA' and negative pulses VB and VB', that is, driving pulses for phase conversion. The collectors of the transistors 7 and 10 are commonly connected to one terminal of a load coil LY, and the collectors of the transistors 8 and 9 are commonly connected to the other terminal of the coil LY. One terminal of the load coil LX is connected through a load coil LZ' to one terminal of the coil LY and the other terminal of the coil LX is through a load coil LZ to the other terminal of the coil LY. Thus, under a PWM control by the positive pulses VA, VA' and the negative pulses VB, VB'. Thus, the single-phase A.C. signal of the power source 1, and the resulting output signal from the transistor bridge circuit under a PWM control by the positive pulses VA, VA' and the negative pulses VB, VB' are applied to the load coil LX of the S1 phase, the coil LY of the S2 phase, the coil LZ of the S3 phase and the coil LZ' of the S3' phase, so that the three-phase output signals are provided for the S1 phase, the S2 phase and the S3 plus S3' phases, each of the output signals having a 120° phase difference therebetween.

Figure 3:
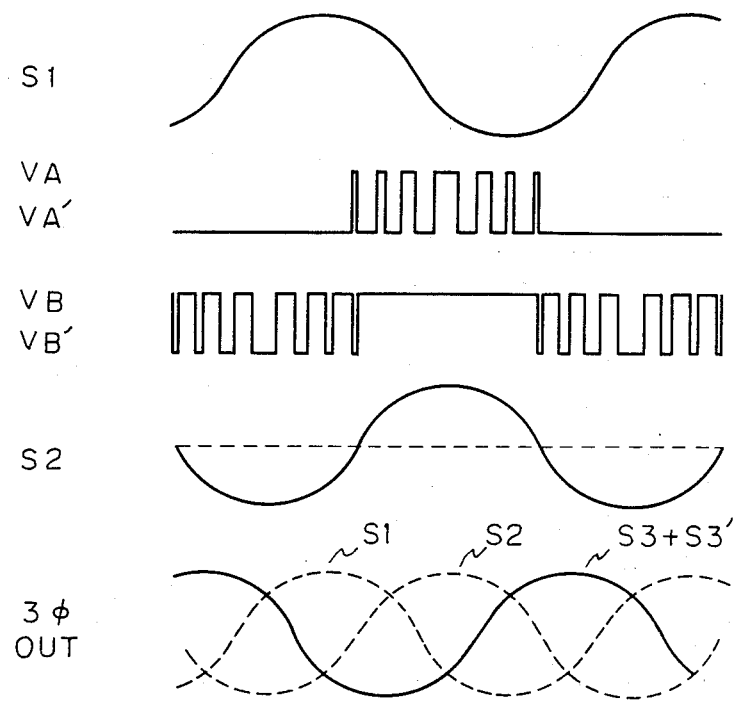
Fig. 3 shows a single waveform diagram illustrating the operation of the circuit shown in FIG. 2.

The operation of the circuit shown in FIG. 2 will be explained with reference to FIG. 3. In FIG. 3, an input voltage waveform of the single-phase A.C. signal applied between the terminals u and v of the input power source 1 is converted to generate an output voltage waveform S2 having a 120° phase shift under the PWM control by the switching pulses VA, VA' and VB, VB' for phase conversion. The output voltage waveforms S1 and S2 which have the same waveform as that of the input power source are composed to generate an output voltage waveform S3+S3'. Thus, a three-phase A.C. power source is formed by the output voltage waveforms S1, S2 and S3 plus S3'.

As compared with the output voltage S1 of the resulting three-phase A.C. outputs, which is directly provided from the input power source 1, the output voltages S2 and S3 may be reduced by a value corresponding to the voltage drop caused by semiconductor elements in the phase converter through such reduction is not so notable as to bring unbalance in operation among the three phases. If a precise operation is required, three-phase magnetic fields can be equalized by adjusting the number of turns of the load windings in proportion to the value corresponding to the voltage drop. Also, with respect to the construction of the load coils, only the S3 phase coil of the three-phase coils may be formed as a two-circuit winding.

What is claimed is:

1. An inverter apparatus for converting a single-phase A.C. power source to three-phase A.C. outputs, characterized in that the single-phase power source is directly connected to first phase load means and is connected through one-phase converter means to second phase load means, and the single-phase power source and the one-phase converted single-phase power source are connected to third phase load means and fourth phase load means, the third and fourth phase load means being formed by dividing single load means, so that three-phase power outputs are provided for the first phase load means, the second phase load means, and the third plus fourth phase load means.

2. The inverter apparatus as set forth in claim 1 characterized in that said single-phase A.C. power source is a home wiring power source.

3. The inverter apparatus as set forth in claim 1 or 2 characterized in that said first through fourth phase load means are the load windings of a three-phase induction motor.

* * * * *